(12) United States Patent
Arend et al.

(10) Patent No.: US 7,287,233 B2
(45) Date of Patent: Oct. 23, 2007

(54) MINIMIZATION FUNCTION FOR A COMPUTER USER INTERFACE

(75) Inventors: Udo Arend, Heidelberg (DE); Edmund Eberleh, St. Leon-Rot (DE); Heinz Willumeit, Leimen (DE)

(73) Assignee: SAP AG, Walldorf (DE)

( * ) Notice: Subject to any disclaimer, the term of this patent is extended or adjusted under 35 U.S.C. 154(b) by 597 days.

(21) Appl. No.: 10/231,896

(22) Filed: Aug. 30, 2002

(65) Prior Publication Data

US 2003/0227488 A1 Dec. 11, 2003

Related U.S. Application Data (60) Provisional application No. 60/386,393, filed on Jun. 5, 2002, provisional application No. 60/386,400, filed on Jun. 5, 2002.

(51) Int. Cl.
*G06F 3/00* (2006.01)
(52) U.S. Cl. .................. 715/795; 715/800; 715/523; 715/841; 715/815
(58) Field of Classification Search ............. 715/800, 715/795, 523, 841, 843, 815
See application file for complete search history.

(56) References Cited

U.S. PATENT DOCUMENTS

| | | | | |
|---|---|---|---|---|
| 5,561,793 A | * | 10/1996 | Bennett et al. | 707/201 |
| 5,649,132 A | * | 7/1997 | Fumarolo et al. | 715/792 |
| 5,737,591 A | | 4/1998 | Kaplan et al. | |
| 5,765,005 A | * | 6/1998 | Maruoka et al. | 715/505 |
| 5,801,703 A | * | 9/1998 | Bowden et al. | 715/841 |
| 5,963,938 A | | 10/1999 | Wilson et al. | |
| 5,986,657 A | * | 11/1999 | Berteig et al. | 715/792 |
| 5,995,984 A | * | 11/1999 | Lau et al. | 715/505 |
| 6,072,486 A | | 6/2000 | Sheldon et al. | |
| 6,151,024 A | | 11/2000 | Alimpich et al. | |
| 6,806,892 B1 | * | 10/2004 | Plow et al. | 715/781 |
| 2004/0001109 A1 | * | 1/2004 | Blancett et al. | 345/843 |

FOREIGN PATENT DOCUMENTS

| | | |
|---|---|---|
| EP | 961197 | 12/1999 |
| GB | 2346717 | 8/2000 |
| GB | 2363044 | 12/2001 |
| WO | 01/13266 | 2/2001 |

OTHER PUBLICATIONS

Microsoft (Registered Trademark) Access 2000 (9.0.6926 SP-3). Copyright 1992-1999.*
Microsoft (Registered Trademark) Excel 2000 (9.0.6926 SP-3). Copyright 1985-1999. Figures 8-11.*
Cooper, "Posture and State," *About Face—The Essentials of User Interface Design*, Hungry Minds, Inc. (publisher), New York, NY, Chapter 12, pp. 151-170, no date.

* cited by examiner

*Primary Examiner*—Kristine Kincaid
*Assistant Examiner*—Ryan Pitaro
(74) *Attorney, Agent, or Firm*—Fish & Richardson P.C.

(57) ABSTRACT

Techniques are disclosed for displaying information to a user on a display device of a computer system. In one general aspect, a first view is displayed on the display device, where the first view has a plurality of objects in a first format and a first object control mechanism. An input is received to minimize the first view, and in response thereto a second view is displayed on the display device. The second view includes a second object control mechanism and one or more objects that are a subset of the plurality of objects in a second format. The second view may include, from the objects displayed in the first view, only those objects contained in the subset of the plurality of objects.

24 Claims, 6 Drawing Sheets

MINIMIZATION FUNCTION FOR A COMPUTER USER INTERFACE

CROSS REFERENCE TO RELATED APPLICATIONS

This application claims priority from U.S. Provisional Application Nos. 60/386,393, filed Jun. 5, 2002, and titled "User Interface with Object Identification Area," and 60/386,400, filed Jun. 5, 2002, and titled "User Interface with Object Task Area," which are incorporated by reference in their entirety.

TECHNICAL FIELD

The invention relates to computer user interfaces.

BACKGROUND

A computer user interface may display several windows or views simultaneously on a computer display screen. Each window may contain one or more work areas. A user working in a work area of a first window may decide to create additional space for other views on the display screen by minimizing or reducing the size of the first window. Rather than minimizing the window itself, the user may decide to minimize a work area within a window, creating additional space within the window for other work areas.

A minimization function, at the direction of a user interface program, makes a window or work area (hereafter referred to as an entity) smaller by hiding all or part of the entity, and making the display space previously occupied by the entity available for other work areas or views.

There are several examples of minimization functions. One example is when a user selects a minimize button from a menu bar or title bar of a window, and the window is minimized and represented as a button with a label, located in a taskbar at the bottom of the display screen. In another example, a minimized work area may be represented as a labeled icon with buttons for restoring, maximizing, or closing the minimized work area.

In either example, if the user later wishes to work with the minimized entity, the user will first have to restore or maximize the minimized entity, potentially obscuring all or part of other windows or work areas on the display screen. The extra step of restoring or maximizing the minimized entity is necessary because the representation of the minimized entity lacks the context of the work area information and the context-related functionality.

SUMMARY

The invention provides techniques for displaying information to a user on a display device of a computer system. In one general aspect, the invention provides for the display of a first view on the display device, where the first view has a plurality of objects in a first format and a first object control mechanism. An input is received to minimize the first view, and in response thereto a second view is displayed on the display device. The second view includes a second object control mechanism and one or more objects that are a subset of the plurality of objects in a second format.

In addition to the plurality of objects and first object control mechanism, the first view may include a work area having information. Similarly, the second view may include a work area having information. In this case, the work area information in the second view may be associated with the one or more objects in the second view.

In some embodiments, the one or more objects from the plurality of objects may comprise a pre-selected object. In this case, a selection may be received from a user, before the input to minimize the first view is received, to pre-select one or more objects. In some implementations, the second view includes, from the objects displayed in the first view, only those objects contained in the subset of the plurality of objects.

In various embodiments, the displayed objects are database objects. The one or more objects that are a subset of the plurality of objects may be edited in the second view. The first or second object control mechanisms may be toolbars. The received input to minimize the first view may occur by the selection of a minimize button. The second view may be smaller than the first view. Additionally, the second view may have the same width as the first view. In other words, the second view may be shorter than the first view because fewer objects are present in the second view. The first format may be a table format, or alternatively, a form format. The second format may be the same as the first format.

Advantages of the invention may include one or more of the following. A new level of functionality for minimized views and work areas is possible. For example, a minimized view incorporating the invention is, in some respects, more flexible, and as such, may be suitable for applications where a minimized view lacking object context and/or object-related functionality would be unsuitable. A minimized view of an object with an object control mechanism providing object-related functionality is presented on a user interface display screen, allowing the object to be viewed and worked-on without having to restore or maximize the view. In some cases, eliminating the need to restore or maximize the view prevents obscuring other work areas on the screen. In these cases, for example, a work area associated with the minimized view may be worked-on in another area of the screen while the object information and functionality in the minimized view are still viewable, accessible, and functional.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
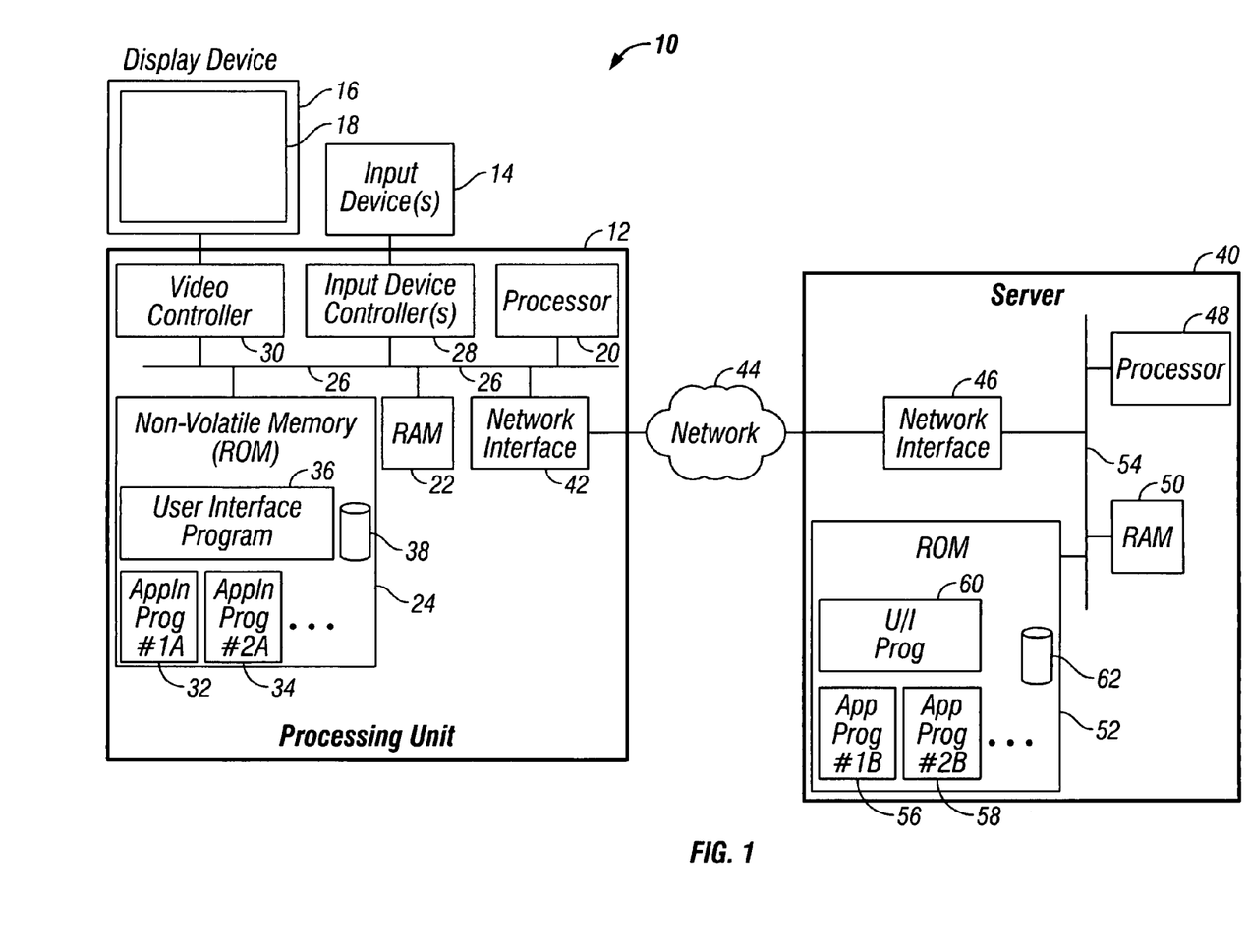
FIG. 1 is a block diagram of a system that may utilize aspects of the invention.

A computer system 10, shown in FIG. 1, includes a processing unit 12, one or more input devices 14, and a display device 16 upon which a user is presented displays in accordance with the invention. The display device 16 has a video screen 18 upon which displays appear.

As is conventional, the processing unit 12 includes a processor 20, random access memory (RAM) 22, and read-only memory (ROM) 24, all interconnected by a data bus 26. Input device controllers 28, also connected to the data bus 26, receive command signals from input devices 14 and forward the command signals in the appropriate format for processing. A video controller 30, connected to the data bus 26, receives video command signals from the data bus 26 and generates the appropriate video signals that are forwarded to the display device 16 so that the desired display is provided on the screen 18. The computer system 10 is not limited to a personal computer, but could instead include a personal digital assistant, a terminal, a workstation, or other such device.

ROM 24, as is conventional, provides non-volatile data storage for various application programs. In the example shown in FIG. 1, a number of different application programs 32, 34, etc., are stored in ROM 24. Also stored in ROM 24 is a user interface program 36 designed to work in concert with each of the application programs 32, 34, etc. This is conceptually depicted in FIG. 1 by the user interface program 36 being shown as a layer on top of the application programs 32, 34, etc. With such a design, user interface program modules common to several application programs need not be duplicated in each of the application programs. In addition, such a design may enable a common "look-and-feel" to the user interface for the different program applications 32, 34, etc. In other implementations, the user interface program, or module, need not be a common program or module for more than one program application. Also, the components just described could be combined or separated in various manners, and could be stored in various manners, such as on various non-volatile storage medium.

As is conventional, programs 32, 34, and 36 have program instructions that may be loaded into RAM 22 during operation. Processor 20 then executes the program instructions, as required, to perform desired program functions.

Also stored in ROM 24 are various data in database 38. Database 38 includes data needed or generated during operation of the application programs 32, 34, etc. In the FIG. 1 implementation, a single database 38 is shown that serves as a common database for all applications 32, 34, etc. In other implementations, there may be separate databases for one, or more, of the applications 32, 34, etc.

Also shown in FIG. 1 is server 40. The computer system 10 has a network interface 42, connected to its data bus 26. As such, computer system 10 may access server 40 via network 44 to run applications residing on the server 40. Network 44 may be, for example, a LAN, WAN, or the Internet. As is conventional, the server 40 includes a network interface 46, a processor 48, RAM 50, and ROM 52, all interconnected by a data bus 54. The server's network interface 46 provides the connection to network 44 so that client computer systems, such as system 10, can access the server 40. In similar fashion to computer system 10, the server ROM 52 includes various different application programs 56, 58, etc., as well as a common user interface program 60 for the application programs 56, 58, etc. ROM 52, in this example, also includes data stored in database 62, although in other implementations separate databases or a separate database server may be required.

The invention will be described in the context of a program application for customer relationship management (CRM). A CRM program application manages the interactions a company may have with its customers, for example, marketing, sales, and service functions. In one implementation, the CRM application program is made up of several different application program modules, some of which reside on a client computer, such as system 10, while others reside on a central server, such as server 40. CRM functions typically require access to, and generate, a large amount of data that is stored in various databases on a client or server. The data can include customer and product information, marketing statistics, and service information, to give just a few examples.

Figure 2:
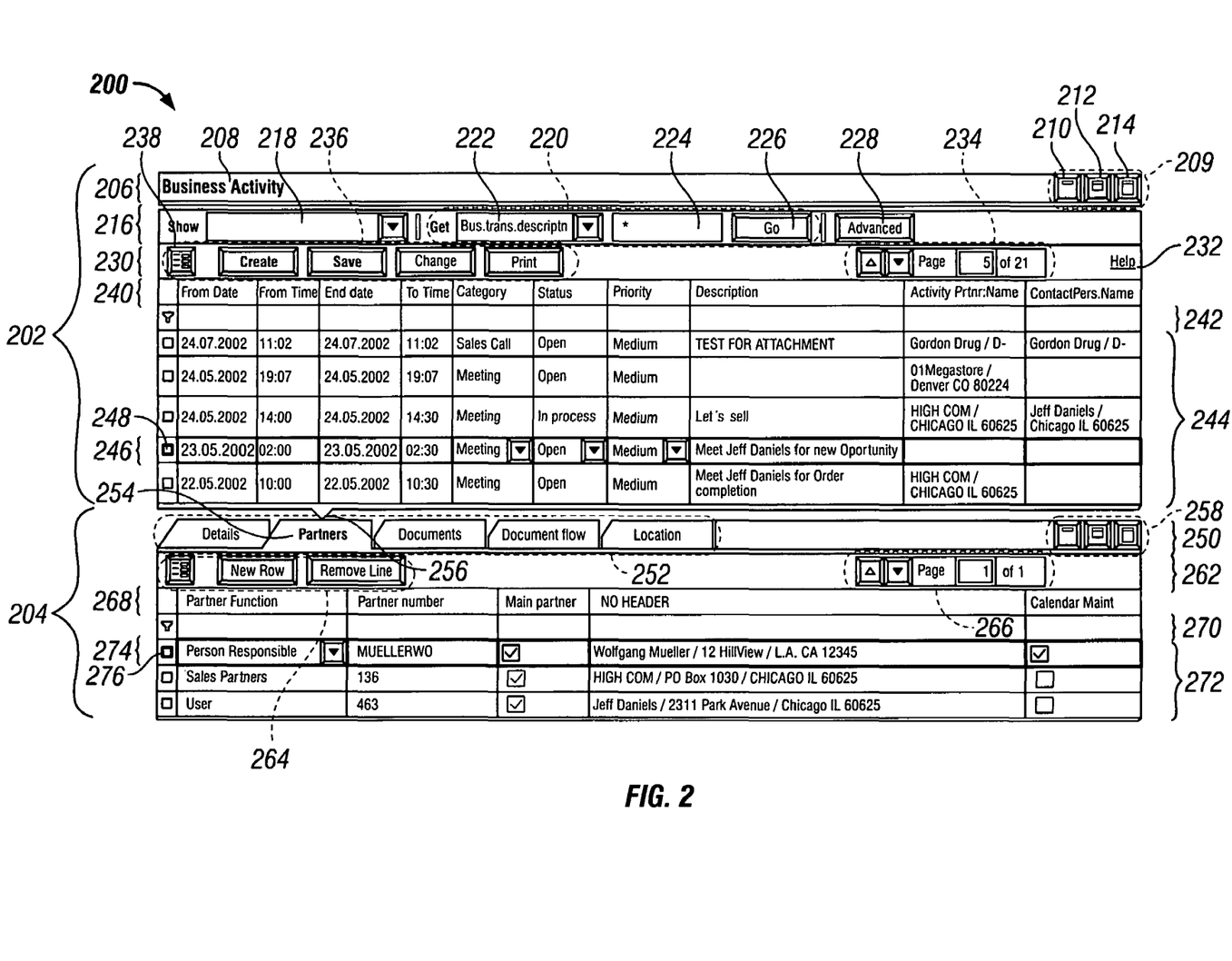
FIGS. 2-3 are screen snapshots of a computer display in accordance with an embodiment of the invention.

FIG. 2 shows an example display 200 that may be presented, on screen 18 shown in FIG. 1, to a user of a CRM application program. In the FIG. 2 example, the user views information relating to various business meetings and sales calls. The user, Wolfgang Mueller in this example, is responsible for a business meeting with a client and a sales partner (a distributor, perhaps) to discuss a new business opportunity, and is reviewing detailed information on the meeting.

The display 200 may be divided into two areas, a top area 202, and a bottom area 204. Generally, the top area 202 is an identification area that allows a user to define and select search criteria for purposes of searching a database, such as database 62 (FIG. 1), for objects that may be presented to the user in a table 244 following the execution of the database search. An object is a collection of data, organized as a group of fields, where each field may contain a data entry that provides information pertaining to the object. Objects may be stored in a database, such as database 62, for access by users via networked computer systems, such as computer system 10. In the FIG. 2 example, the objects represent scheduled meetings and sales calls.

The bottom area 204 is a data area providing detailed information, called sub-objects, on the objects from the identification area 202 above. Like objects, sub-objects are made up of fields and may also be stored in a database, such as database 62. Sub-objects displayed in the data area 204 may be associated with a selected object from the identification area 202. In the FIG. 2 example, the object represents a meeting with a partner, while the sub-objects represent information regarding the participants at the meeting.

Beginning with the identification area 202, a title row 206 is located along an upper edge of area 202. The title row 206 contains a display title 208 ("Business Activity") near its left side, informing the user, in this example, that display 200 contains information on business activities. A group of size-adjust buttons 209, near the right side of the title row 206, allows a user to change the size of the identification area 202 and will be described later.

A search bar 216, located below the title row 206, provides database search mechanisms that a user may use to search for, and identify, objects stored in the database 62. A first search mechanism 218, located near the left side of the search bar 216, is a "Show" mechanism containing a drop-down list with a selection of predefined searches that allow a user to retrieve collections of objects using previously-defined search patterns. A second search mechanism 220, positioned to the right of the "Show" mechanism 218, is a search tool having three parts: 1) a "Get" list 222 for selecting a field label, 2) a string entry field 224 for providing a search string, and 3) a "Go" button 226 for initiating the search. After choosing a field label from the "Get" list 222 and providing a search string in the search field 224, a user may select the "Go" button 226 to initiate a database search for objects having the entered search string in the selected field. A third mechanism 228 is an "Advanced" search button, positioned to the right of the "Go" button 226, which allows a user to define advanced search criteria for searching the database 62. This is the mechanism that a user would use if neither the first nor the second search mechanisms 218, 220 met the user's needs.

In the FIG. 2 example, a user has selected an object field label called "Bus. trans. descriptn" from the "Get" list 222, and has entered a wild card asterisk character ("*") in the string entry field 224. The wild card character permits any combination of characters in the correspondingly selected field to satisfy the search criterion. After selecting the "Go" button 226, a database search executes (for example, on database 62) and the user is presented with all of the objects having a "Bus. trans. descriptn" field from database 62.

Moving to the next row in the identification area 202, there is an object control mechanism 230, or toolbar. The toolbar 230 contains a "Help" icon 232 and a page navigation area 234 near its right side, and a group of action buttons 236 near its left side. The "Help" icon 232, as is conventional, provides the user with assistance when it is selected. The page navigation area 234 provides a page number indicator (page 5 of 21 in this example, indicating that there are twenty-one pages of objects in table 244, with page five currently displayed), and buttons for displaying the next page or previous page of objects. A first action button 238 in the group of action buttons 236 is displayed as a button with several lines and boxes and, when selected, causes the table 244 of objects to be replaced by a display of a single selected object's fields of information, in a tabular display called a "form" view of the object. The remaining buttons in the group of action buttons 236 cause actions to occur that may affect the table 244 of objects and the data area 204. Examples of such actions include creating a new object, saving changes made to an object (or sub-object), changing an object (sub-object), and printing an object's (sub-object's) information. The toolbar 230 may contain other (including a different number of) buttons in other embodiments.

A column label row 240, located below the toolbar 230, provides labels that identify field names for each of the columns in the table 244 of objects. The column labels in this example are "From Date," the date the business activity begins; "From Time," the start time; "End date," the date the business activity ends; "To Time," the end time; "Category," the type of business activity; "Status," the current state of the activity; "Priority," the priority level (Low, Medium, or High); "Description," a note section; "Activity Prtnr. Name," the name of a person or group assisting with the activity; and "Contact Pers. Name," the name of the activity contact person. A filter row 242, located below the row of column labels 240, is partitioned into sections that correspond to the columns of the table 244 below. The filter row 242 allows a user to filter the table 244 of objects by sorting the objects according to one or more conditions, and displaying only those objects that satisfy the condition(s).

The table 244 of objects in FIG. 2 displays each object as a row. The table 244 is located below the filter row 242 and, in this example, five objects are shown (although, as described above, table 244 consists of twenty-one pages with only the fifth page shown in FIG. 2). The columns of the table 244 correspond to the fields of the objects, identified by the respective label in the row of column labels 240. The table 244 of objects was created using objects identified by a database search initiated by one of the three search mechanisms from the search bar 216, described above (the search tool 220 in this example).

Object 246, the fourth object shown in table 244 of FIG. 2, describes a meeting to be held from 2:00 to 2:30 on May 23, 2002, with Jeff Daniels to discuss a new business opportunity. Object 246 is selected, as indicated by a highlighted selection icon 248 near the left side of object 246. Three additional meeting objects, and one sales call object round out the objects displayed in the FIG. 2 table 244 of objects. Further information on the selected object 246 is provided in the data area 204 below the table 244 of objects.

Returning now to the group of size-adjust buttons 209 near the right side of the title row 206, a minimize button 210 on the left, a normal button 212 in the center, and a maximize button 214 on the right allow a user to set the size of identification area 202 to "small", "medium", or "large", respectively. The size of identification area 202 in FIG. 2 is "medium", as indicated by the lighter shading of the normal button 212 in relation to the minimize and maximize buttons 210, 214. The darker shading of the minimize and maximize buttons 210, 214, indicate that the buttons are active, or able to be selected by the user, whereas the normal button 212 is inactive.

Suppose that display 200 in FIG. 2 occupies the upper half of a user's display screen 18 (FIG. 1). The lower half of the screen 18 might contain other work areas. The medium-sized identification area 202 in FIG. 2 displays five objects. The user could select the maximize button 214, thereby causing additional objects to be displayed by making identification area 202 "large" in size and expanding the table 244 of objects. This causes data area 204 to be shifted downward on screen 18, providing space for additional objects to be displayed in table 244. Data area 204 would be moved downward as far as possible on screen 18, without disturbing other work areas, permitting a maximum number of objects to be displayed in table 244 of identification area 202.

Figures 3, 4:
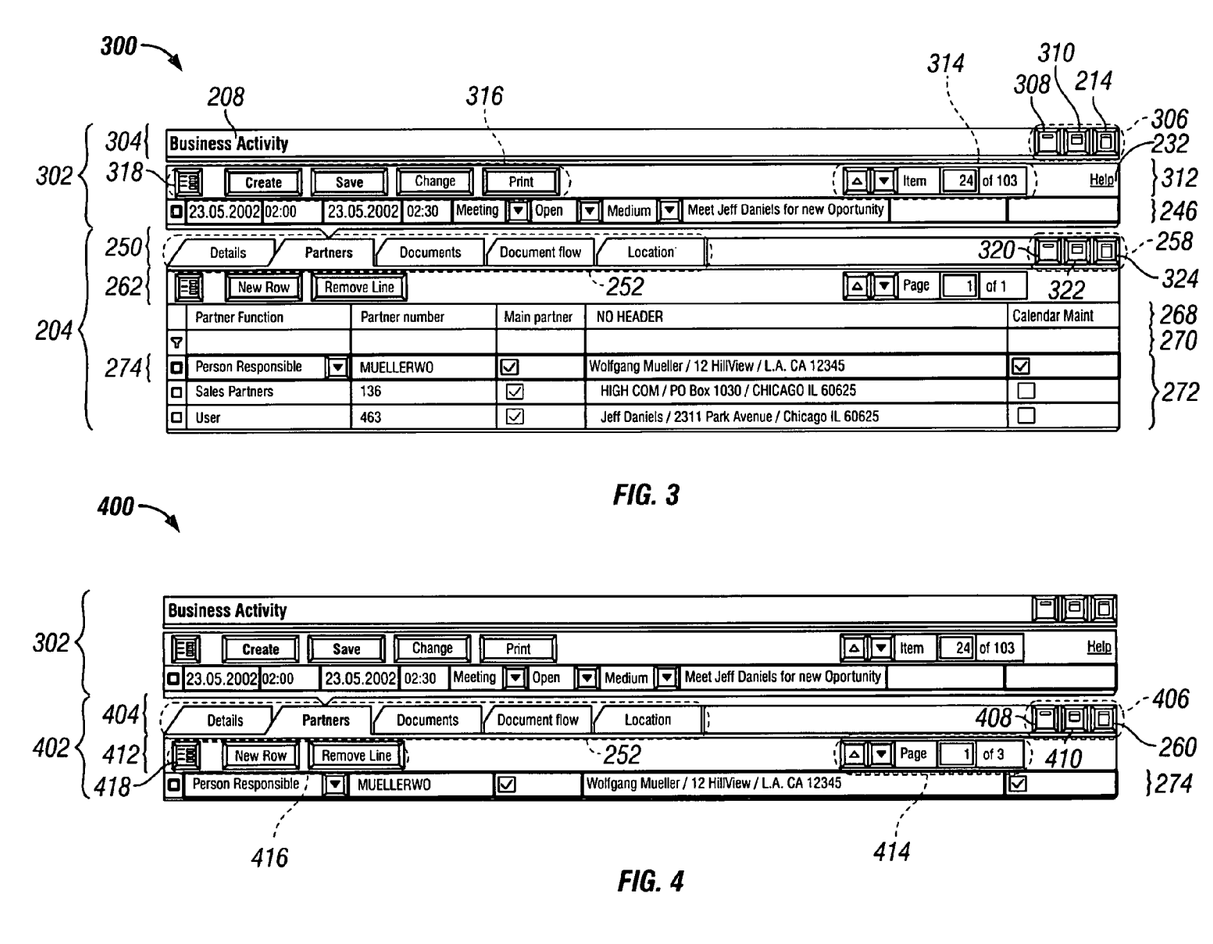
FIG. 4 is a screen snapshot of a computer display in accordance with another embodiment of the invention.

Suppose again that display 200 in FIG. 2 occupies the upper half of a user's screen 18. Now suppose that a user is only interested in viewing the selected object 246 in table 244, and wishes to create additional space for other work areas on screen 18, while still preserving the ability to view and work with object 246 or any of its associated sub-objects in data area 204 below. The user could select the minimize button 210, thereby making identification area 202 "small" in size by hiding all unselected objects in table 244, the filter row 242, the column label row 240, and the search bar 216. This would leave the title row 206, the toolbar 230, and the selected object 246 as the remaining three rows in a minimized identification area. FIG. 3 shows the resulting display 300, created by the user interface after selection of the minimize button 210, and will be described later.

In contrast, if the user had not selected any of the objects in the table 244 before selecting the minimize button 210, no object would be shown in the resulting display. That is, the resulting display would include the title row 206 and toolbar 230.

Referring again to FIG. 2, the data area 204 of display 200 provides a categorized table 272 of data, in the form of sub-objects, for the selected object 246 from the identification area 202. Each sub-object corresponds to a category represented by a tab in a tab section 252 of the data area 204. The tab section 252 is located near the left side of a label row 250, at the top of data area 204, and features a selection of tabs indicating the classes of information that may be displayed in the table 272 of sub-objects. In the FIG. 2 example, a "Partners" tab 254 is selected (note the darker shading in relation to the other tabs) and the sub-objects in the table 272 provide information on parties (partners) expected to attend the business meeting identified by object 246. An arrow 256 above the "Partners" tab 254 provides another indicator of the currently selected tab. Were a different tab to be selected from the tab section 252, a different set of sub-objects would be displayed, perhaps in a different format. A group of size-adjust buttons 258, near the right side of the label row 250, allows a user to change the size of the data area 204, for example, by minimizing, maximizing, or restoring the data area to its normal size. The data area size-adjust buttons 258 will be further described below.

A toolbar 262 for the data area 204 is located below the label row 250. The toolbar 262 contains a group of action buttons 264 near its left side and a page navigation area 266 near its right side. The group of action buttons 264 cause actions to occur, when selected, that affect the table 272 of sub-objects. Examples of such actions include replacing the table 272 of sub-objects by a display of a single selected sub-object's fields of information, creating a new sub-object, and removing an existing sub-object. The page navigation area 266 provides a page number indicator (page 1 of 1 in this example) for the table 272 of sub-objects, and buttons for displaying the next page or previous page of sub-objects, if applicable.

A column label row 268, similar to the column label row 240 for table 244, provides labels identifying field names for each of the columns in the table 272 of sub-objects. Here, the column labels are "Partner Function," the function of the partner named by the sub-object; "Partner number," a user name or number identifying the partner; "Main partner," a checkbox denoting whether the partner is (checked) or is not (unchecked) a primary partner; "NO HEADER," the name and address of the partner; and "Calendar Maint.," whether the partner is responsible for scheduling the meeting and coordinating with the scheduled attendees. A filter row 270, below the row of column labels 268, provides the same functionality for the table 272 of sub-objects as the filter row 242 provides for the table 244 of objects.

The table 272 of sub-objects in FIG. 2 displays each sub-object as a row. The table 272 is located below the filter row 270 and, in this example, three sub-objects are shown. Sub-object 274, the first sub-object in the table 272, describes the person (Wolfgang Mueller in this example) responsible for the meeting identified by the selected object 246 in the identification area 202. Sub-object 274 is selected, as indicated by a highlighted selection icon 276 near its left edge. A sales partner sub-object and a customer or product user sub-object complete the table 272 of sub-objects.

The FIG. 3 display 300 presents a minimized identification area 302, resulting from a user selecting the minimize button 210 in identification area 202 (FIG. 2), and the unchanged data area 204 from FIG. 2, below the minimized identification area 302. Beginning with the identification area 302, a title row 304 is located along an upper edge of identification area 302. The title row 304 contains the unchanged display title 208 ("Business Activity") from display 200 (FIG. 2) near its left side, and a group of size-adjust buttons 306 near its right side. The size-adjust buttons 306 correspond in function and position to the size-adjust buttons 209 from FIG. 2. Because identification area 302 is minimized, the minimize button 308 is inactive (grayed-out). The normal button 310 in FIG. 3 is active, as is the maximize button 214.

A toolbar 312, located below the title row 304, fills the second row of the minimized identification area 302. The toolbar 312 contains a "Help" icon 232 and an object navigation area 314 near its right side, and a group of action buttons 316 near its left side. The "Help" icon 232 is unchanged from the FIG. 2 display, and is as described in the discussion of FIG. 2. The object navigation area 314 provides an object number indicator (object 24 of 103 in this example) indicating that there are 103 objects in table 244 (FIG. 2), with object 246 being the twenty-fourth object. Buttons for displaying the next or previous object are also provided in the object navigation area 314. A first action button 318 in the group of action buttons 316 is inactive because it is not possible to display a form view of an object in a minimized area 302. The remaining buttons in the group of action buttons 316 cause actions to occur that may affect the minimized identification area 302 and the data area 204. Examples of such actions include creating a new object, saving changes made to an object (or sub-object), changing an object (sub-object), and printing an object's (sub-object's) information.

The selected object 246, below the toolbar 312, completes the minimized identification area 302. Object 246 is unchanged from the FIG. 2 display, and is as described in the discussion of FIG. 2. Thus, it is seen that the minimized identification area 302 retains both the object 246 of interest from the identification area 202 (FIG. 2), and the object-related functionality, in the form of the toolbar 312, within a compact, three-row representation allowing more space for other work areas on screen 18. A user could, for example, make and save changes to object 246, or print information on object 246 without having to expand or maximize the minimized identification area 302 of FIG. 3, or restore it to the previous view 202 of FIG. 2. Additionally, a user could work with one of the object's 246 associated sub-objects in the table 272 of sub-objects, using the minimized identification area 302 as a sort of orientation area (providing the most general information in object 246, along with the functionality provided by the toolbar 312) to the more detailed data area 204 below. For example, a user could make changes to a sub-object and save the changes using the group of action buttons 316 in the toolbar 312. The relative proximity of object 246 in the minimized identification area 302 to the table 272 of sub-objects reminds the user that the sub-objects in data area 204 are associated with object 246.

The data area 204, below the minimized identification area 302 in display 300, is unchanged from the data area 204 of display 200 (FIG. 2) because the user's selection of the minimize button 210 in identification area 202 of FIG. 2 has no effect on the data area 204. Data area 204 is as described in the discussion of FIG. 2.

Considering now the group of size-adjust buttons 258 in the upper right corner of data area 204, a minimize button 320 on the left, a normal button 322 in the center, and a maximize button 324 on the right allow a user to set the size of data area 204 to "small", "medium", or "large", respectively. The size of data area 204 in FIG. 3 (and FIG. 2) is "medium", as indicated by the lighter shading of the normal button 322 in relation to the minimize and maximize buttons 320, 324. The darker shading of the minimize and maximize buttons 320, 324, indicate that these buttons are active (able to be selected by the user), whereas the normal button 322 is inactive.

The medium-sized data area 204 in FIG. 3 displays three sub-objects. Although in this example the data area 204 already displays all available "Partner" sub-objects (of object 246) in "medium" size, other examples may contain more sub-objects. In another example, a user could select the maximize button 324, thereby causing additional sub-objects to be displayed by making data area 204 "large" in size and expanding the table 272 of sub-objects.

Now suppose a user is only interested in viewing the selected sub-object 274 in table 272 and wishes to create additional space for other work areas on screen 18, while still maintaining the ability to view and work with sub-object 274. The user could select the minimize button 320, thereby making data area 204 "small" in size, by hiding all unselected sub-objects in table 272, the filter row 270, and the column label row 268. This would leave the label row 250, the toolbar 262, and the selected sub-object 274 as the remaining three rows in a minimized data area. FIG. 4 shows the resulting display 400, created by the user interface after selection of the minimize button 320.

In contrast, if the user had not selected any of the sub-objects in the table 272 before clicking the minimize button 320, none of the sub-objects would be included in the resulting view. That is, the resulting view would include the label row 250 and the toolbar 262.

The FIG. 4 display 400 presents the minimized identification area 302 from FIG. 3, and a minimized data area 402, resulting from a user selecting the minimize button 320 in data area 204 (FIG. 3). The minimized identification area 302, located at the top of display 400, appears unchanged from FIG. 3 and is as described in the discussion of FIG. 3.

The minimized data area 402, located below area 302, contains a label row 404 that is located along an upper edge of area 402. The label row 404 contains the unchanged tab section 252 from display 300 (FIG. 3) near its left side, and a group of size-adjust buttons 406 near its right side. The size-adjust buttons 406 correspond in function and position to the size-adjust buttons 258 from FIG. 3. Because data area 402 is minimized, the minimize button 408 is inactive (grayed-out). The normal button 410 in FIG. 4 is active, as is the maximize button 260.

A toolbar 412, located below the label row 404, fills the second row of the minimized data area 402. The toolbar 412 contains a sub-object navigation area 414 near its right side, and a group of action buttons 416 near its left side. The sub-object navigation area 414 provides a sub-object number indicator (sub-object 1 of 3 in this example) indicating that there are three sub-objects in table 272 (FIG. 3), with sub-object 274 being the first sub-object. Buttons for displaying the next or previous sub-object are also provided in the sub-object navigation area 414. The first action button 418 in the group of action buttons 416 is inactive because it is not possible to display a form view of a sub-object in a minimized area 402. The remaining buttons in the group of action buttons 416 cause actions to occur that affect the minimized data area 402. Examples of such actions include creating a new sub-object or removing an existing sub-object.

The selected sub-object 274, below the toolbar 412, completes the minimized data area 402. Sub-object 274 is unchanged from the FIG. 3 display. Thus, it is seen that the minimized data area 402 retains both the sub-object 274 of interest from data area 204 of FIG. 3, and much of the sub-object-related functionality, in the form of the toolbar 412, within a compact, three-row representation that allows more space for other work areas on screen 18 (FIG. 1).

Figure 5:
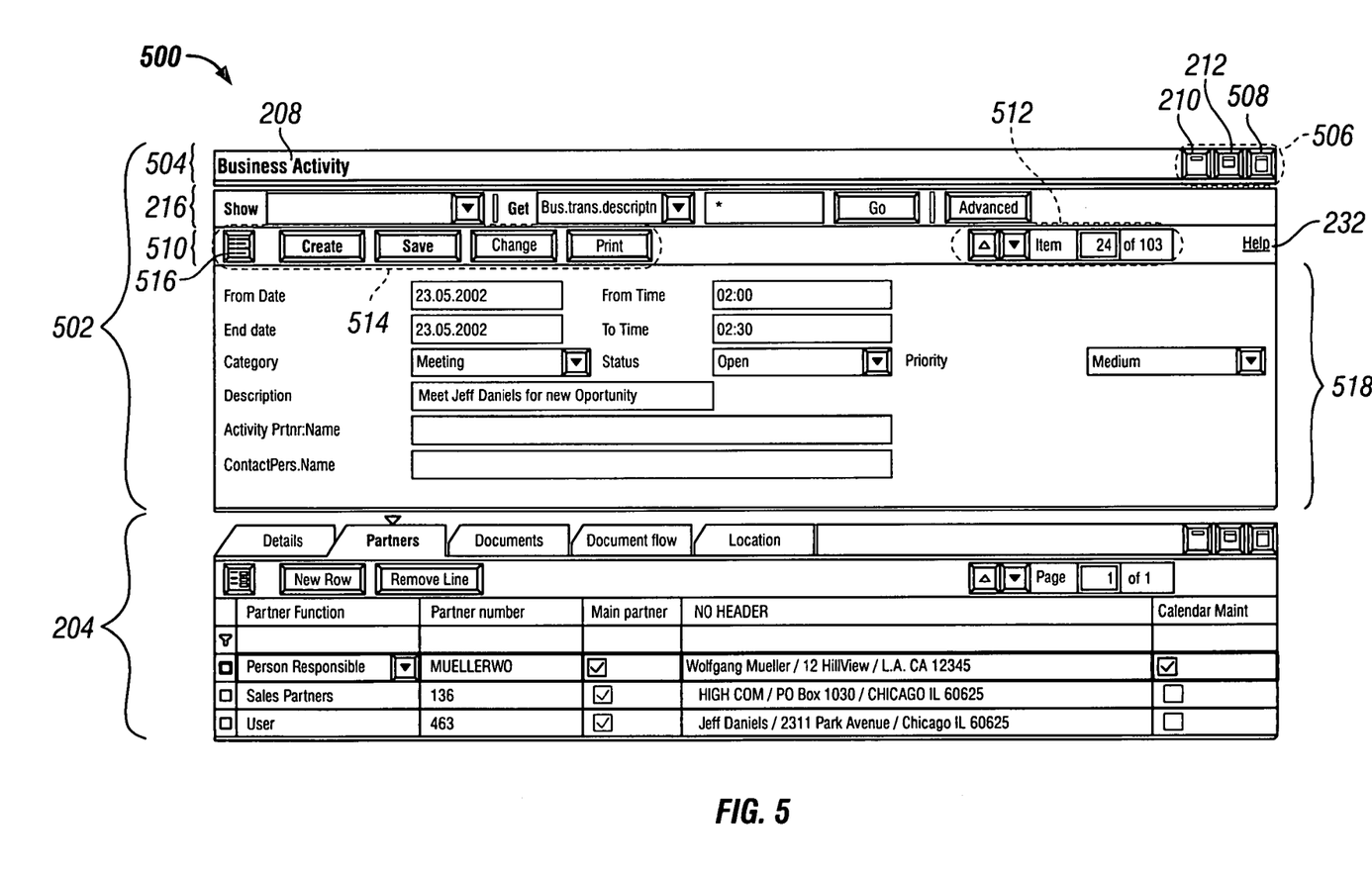
FIG. 5 is a screen snapshot of a computer display in accordance with another embodiment of the invention.

Another example of a display candidate for minimization is shown in FIG. 5. The FIG. 5 display 500 presents a data area 204, and an identification area 502, above the data area 204, containing a form view 518 of an object. Display 500 might appear, for example, if a user selected button 238 in the table-view identification area 202 of FIG. 2, causing the selected object 246 to be displayed in a form view 518. The form view 518 may provide a more intuitive way to enter, edit, and review object data, and may also allow for the display of more data at once.

Beginning with the identification area 502, a title row 504, located along an upper edge of area 502, contains the unchanged title 208 ("Business Activity") from the FIG. 2 display near its left edge, and a group of size-adjust buttons 506 near its right edge. The right-most two size adjust buttons, a normal button 212, and a maximize button 508, are inactive. An active minimize button 210, to the left of the normal button 212, will be discussed below.

A search bar 216, below the title bar 504, appears unchanged from the FIG. 2 display 200, and is as described in the discussion of FIG. 2. A toolbar 510, below the search bar 216, contains a "Help" icon 232 and an object navigation area 512 near its right side, and a group of action buttons 514 near its left side. The "Help" icon 232, as is conventional, provides the user with assistance when selected. The object navigation area 512 provides an object number indicator (object 24 of 103 in this example, indicating that there are 103 objects, with object twenty-four currently displayed), and buttons for displaying the next or previous object. A first action button 516 in the group of action buttons 514 is displayed as a button with several lines and, when selected, causes the form view 518 of an object to be replaced by a table view of multiple objects. The remaining buttons in the group of action buttons 514 cause actions to occur that may affect the form view 518 of an object and the data area 204. Examples of such actions include creating a new object, saving changes made to an object (or sub-object), changing an object (sub-object), and printing an object's (sub-object's) information. The toolbar 510 may contain other (including a different number of) buttons in other embodiments.

A form view 518 of an object, located below the toolbar 510, presents the various fields and associated field labels of the object in an easy-to-read format, allowing a user to focus on the object of interest. In the FIG. 5 example, the form view 518 of object 246 from FIG. 2 is shown. The form view 518 presents the same field information concerning object 246 as the table 244 of objects in FIG. 2.

Suppose that display 500 in FIG. 5 occupies the upper half of a user's display screen 18 (FIG. 1), with the lower half of the screen 18 occupied by other work areas. Now assume that a user wishes to create additional space for other work areas on screen 18, while still preserving the ability to work with the field information of object 246, currently displayed in form view 518. The user could select the minimize button 210, thereby making identification area 502 "small" in size by converting the form view 518 into a minimized table view of object 246 and hiding the search bar 216. FIG. 3, described earlier, shows the resulting display 300, created by the user interface after selection of the minimize button 210.

Figure 6:
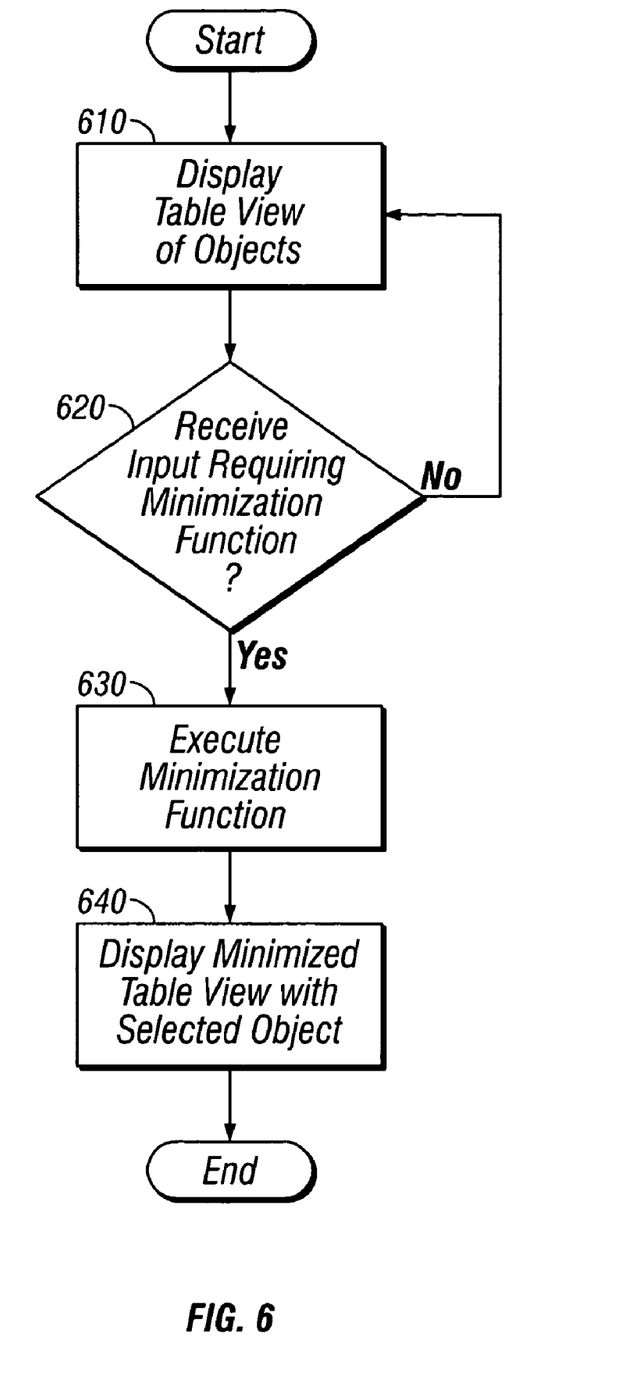
FIGS. 6-7 are flowcharts illustrating how a user interface software application shown in FIG. 1 operates to produce the displays shown in FIGS. 2-5.

Referring to the flowchart of FIG. 6, the process performed by a processor executing instructions from a user interface program begins, at step 610, with the display of a table view of objects (or sub-objects) on screen 18 (FIG. 1). An example of a table view of objects is shown in identification area 202 of FIG. 2; an example of a table view of sub-objects is shown in data area 204 of FIG. 3. Next, the receipt of an input requiring that a minimization function be performed, at step 620, prompts the execution of a minimization function in step 630. In the absence of such a received input, the display with the table view of objects (sub-objects) will continue to be displayed (step 610). Examples of user inputs that may be received and necessitate the execution of a minimization function might include the click of a mouse button (for example, to select a minimize button), the typing of a key or sequence of keys on the keyboards a voice-activated command input, the touch of a touchpad screen, etc.

The minimization function executes by hiding all unselected objects (sub-objects) in the table, the filter row, the column label row, and the search bar. This leaves the title (label) row, the toolbar, and the selected object (sub-object) to be displayed in a minimized table view.

Next, the resulting minimized table with a selected object (sub-object) will be displayed at step 640 and the process ends. An example of a view having a minimized table with a selected object is shown in the identification area 302 of FIG. 3; an example of a view having a minimized table with a selected sub-object is shown in the data area 402 of FIG. 4.

Figure 7:
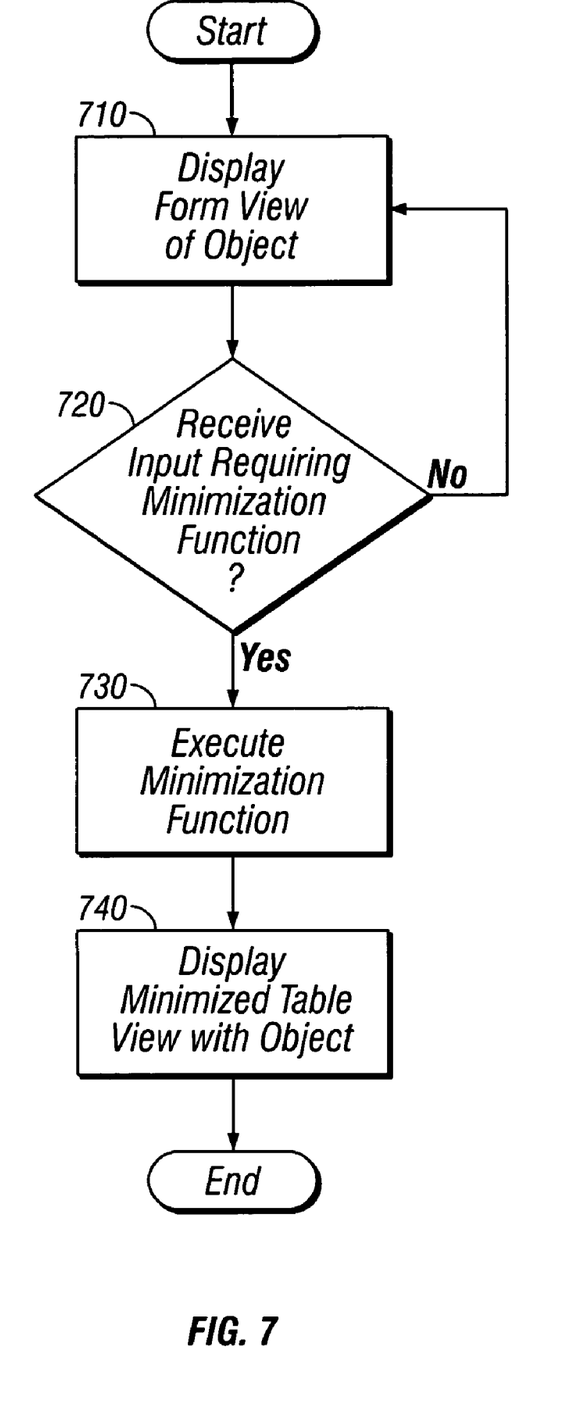

Referring to the flowchart of FIG. 7, the process performed by a processor executing instructions from a user interface program begins, at step 710, with the display of a form view of an object on screen 18 (FIG. 1). An example of a form view of an object is shown in identification area 502 of FIG. 5. Next, the receipt of an input requiring that a minimization function be performed, at step 720, prompts the execution of a minimization function in step 730. In the absence of such a received input, the display with the form view of an object will continue to be displayed (step 710).

The minimization function executes by converting the form view of the object into a minimized table view with the object and hiding the search bar. This leaves the title row, the toolbar, and the object to be displayed.

Next, the resulting minimized table with the object will be displayed at step 740 and the process ends. An example of a view with an object in a minimized table view is shown in the identification area 302 of FIG. 3.

A number of embodiments of the invention have been described. Nevertheless, it will be understood that various modifications may be made without departing from the spirit and scope of the invention. For example, the various views may display data using a variety of formats and arrangements, and may display one or multiple objects in any particular view. Accordingly, other embodiments are within the scope of the following claims.

What is claimed is:

1. A method of displaying information on a display device of a computer system, comprising:
    displaying a first view on the display device, the first view including an area comprising a plurality of objects, the area being configured to have at least two predefined minimized states, a first minimized state in which at least one of the objects that was selected before minimization is visible, and a second minimized state in which none of the objects are visible;
    receiving an input to minimize the first view, the input made using an input control that causes the area to be presented in the first minimized state if the at least one object had been selected before receipt of the input, and that causes the area to be presented in the second minimized state if no object had been selected before receipt of the input;
    determining, in response to receiving the input, whether a user has selected any of the plurality of objects in the first view;
    displaying, after the determination, a second view on the display device instead of the first view, the second view including the area presented in either of the first and second minimized states based on the determination;
    wherein the user has selected the at least one object from the plurality of objects and wherein the selection causes additional information about the selected at least one object to be presented in the first view;
    wherein the first view further comprises a work area, the work area including the additional information, further comprising including the work area in the second view;
    wherein the work area includes several sub-objects associated with the selected at least one object;
    the method further comprising:
    receiving, while displaying the second view, another input to minimize the work area;
    determining, in response to receiving the other input, whether the user has selected any of the several sub-objects in the work area;
    displaying, in response to determining that the user has selected at least one sub-object in the work area, a third view instead of the second view, the third view comprising an object control mechanism, the selected at least one object, and the selected at least one sub-object; and
    displaying, in response to determining that the user has not selected any of the several sub-objects in the work area, a fourth view instead of the second view, the fourth view comprising an object control mechanism, the selected at least one object, and none of the several sub-objects.

2. The method of claim 1 wherein the selection of the at least one object identifies the at least one object from the plurality of objects as a target for an operation using a first object control mechanism.

3. The method of claim 1 wherein the objects are database objects.

4. The method of claim 1 wherein the received input occurs by the selection of a minimize button.

5. The method of claim 1 wherein the selected at least one object of the plurality of objects may be edited in the second view.

6. The method of claim 1 wherein the area includes a toolbar.

7. The method of claim 6 wherein the toolbar is included also in the second view.

8. The method of claim 1, wherein the first minimized state has the same width as the area before minimization.

9. The method of claim 1 wherein the second minimized state has the same width as the area before minimization.

10. The method of claim 1 wherein the first view presents the plurality of objects in a table format.

11. The method of claim 10 further comprising:
    receiving, before receiving the input to minimize the first view, another input to change the first view from the table format to a form format; and
    displaying, in response to receiving the other input, another view on the display device, the other view presenting the selected at least one object in the form format.

12. The method of claim 11 wherein the second view, when displayed, presents the selected at least one object in the table format.

13. Computer-readable medium with program instructions stored thereon that when executed perform the following functions for providing display information on a display device of a computer system:
    displays a first view on the display device, the first view including an area comprising a plurality of objects, the area being configured to have at least two predefined minimized states, a first minimized state in which at least one of the objects that was selected before minimization is visible, and a second minimized state in which none of the objects are visible;

receives an input to minimize the first view, the input made using an input control that causes the area to be presented in the first minimized state if the at least one object had been selected before receipt of the input, and that causes the area to be presented in the second minimized state if no object had been selected before receipt of the input;

determines, in response to receiving the input, whether a user has selected any of the plurality of objects in the first view;

displays, after the determination a second view on the display device instead of the first view, the second view including the area presented in either of the first and second minimized states based on the determination;

wherein the user has selected the at least one object from the plurality of objects and wherein the selection causes additional information about the selected at least one object to be presented the first view;

wherein the first view further comprises a work area, the work area including the additional information, and wherein the functions further comprise including the work area in the second view;

wherein the work area includes several sub-objects associated with the selected at least one object;

the functions further comprising:

receives while displaying the second view, another input to minimize the work area;

determines in response to receiving the other input, whether the user has selected any of the several sub-objects in the work area;

displays, in response to determining that the user has selected at least one sub-object in the work area, a third view instead of the second view, the third view comprising an object control mechanism, the selected at least one object, and the selected at least one sub-object; and displays, in response to determining that the user has not selected an of the several sub-objects in the work area, a fourth view instead of the second view, the fourth view comprising an object control mechanism, the selected at least one object, and none of the several sub-objects.

14. The medium of claim 13 wherein the selection of the at least one object identifies the at least one object from the plurality of objects as a target for an operation using a first object control mechanism.

15. The medium of claim 13 wherein the objects are database objects.

16. The medium of claim 13 wherein the received input occurs by the selection of a minimize button.

17. The medium of claim 13 wherein the selected at least one object of the plurality of objects may be edited in the second view.

18. The medium of claim 13 wherein the area includes a toolbar.

19. The medium of claim 18 wherein the toolbar is included also in the second view.

20. The method of claim 13, wherein the first minimized state has the same width as the area before minimization.

21. The medium of claim 20 wherein the second minimized state has the same width as the area before minimization.

22. The medium of claim 13 wherein the first view presents the plurality of objects in a table format.

23. The medium of claim 22 wherein the functions further comprise:

receiving, before receiving the input to minimize the first view, another input to change the first view from the table format to a form format; and displaying, in response to receiving the other input, another view on the display device, the other view presenting the selected at least one object in the form format.

24. The medium of claim 23 wherein the second view, when displayed, presents the selected at least one object in the table format.

* * * * *